United States Patent
Kim et al.

(10) Patent No.: US 7,254,838 B2
(45) Date of Patent: Aug. 7, 2007

(54) COPY PROTECTION METHOD AND SYSTEM FOR DIGITAL MEDIA

(75) Inventors: Hyung Sun Kim, Seoul (KR); Alexandre Stechkine, Seoul (KR); Byung Jin Kim, Songnam-shi (KR); Soung Hyun Um, Anyang-shi (KR)

(73) Assignee: LG Electronics, Inc., Seoul (KR)

( * ) Notice: Subject to any disclaimer, the term of this patent is extended or adjusted under 35 U.S.C. 154(b) by 819 days.

(21) Appl. No.: 10/135,840

(22) Filed: May 1, 2002

(65) Prior Publication Data

US 2002/0169973 A1 Nov. 14, 2002

Related U.S. Application Data

(60) Provisional application No. 60/290,018, filed on May 11, 2001.

(51) Int. Cl.
  *H04L 9/32* (2006.01)
  *H04N 7/167* (2006.01)
  *H04L 9/00* (2006.01)
  *G06F 12/14* (2006.01)

(52) U.S. Cl. ............... 726/29; 380/201; 380/278; 380/281; 380/282; 713/193

(58) Field of Classification Search ............... 713/193; 380/45, 281, 201, 282; 726/31, 32, 33, 29; 705/52, 53, 54
See application file for complete search history.

(56) References Cited

U.S. PATENT DOCUMENTS

| | | | |
|---|---|---|---|
| 5,974,150 A * | 10/1999 | Kaish et al. ............... | 713/179 |
| 6,226,618 B1 * | 5/2001 | Downs et al. ............... | 705/1 |
| 6,246,767 B1 * | 6/2001 | Akins et al. ............... | 380/210 |
| 6,385,596 B1 * | 5/2002 | Wiser et al. ............... | 705/51 |
| 6,389,403 B1 * | 5/2002 | Dorak, Jr. ............... | 705/52 |
| 6,418,421 B1 * | 7/2002 | Hurtado et al. ............ | 705/54 |
| 6,687,822 B1 * | 2/2004 | Jakobsson ............... | 713/156 |
| 2001/0010046 A1 * | 7/2001 | Muyres et al. ............ | 705/52 |
| 2001/0032312 A1 * | 10/2001 | Runje et al. ............... | 713/172 |
| 2001/0053223 A1 * | 12/2001 | Ishibashi et al. ............ | 380/231 |
| 2002/0010861 A1 * | 1/2002 | Matsuyama et al. ........ | 713/182 |
| 2002/0021805 A1 * | 2/2002 | Schumann et al. ......... | 380/201 |
| 2002/0071566 A1 * | 6/2002 | Kurn ............... | 380/281 |
| 2002/0118838 A1 * | 8/2002 | Belenko et al. ............ | 380/277 |

* cited by examiner

*Primary Examiner*—Gilberto Barrón, Jr.
*Assistant Examiner*—Virgil Herring
(74) *Attorney, Agent, or Firm*—KED & Associates, LLP

(57) ABSTRACT

A copy protection method and a copy protection system are disclosed. The system includes a private key verifier receiving a media certificate that includes a private key identification of a compliant playing device and searching for an actual private key corresponding to the private key identification, an intermediate key decryptor receiving an encrypted intermediate key and decrypting the intermediate key with the actual private key, a media key decryptor obtaining an original media key by decrypting the decrypted intermediate key with a media identification; and a media data decryptor receiving an encrypted media data set and decrypting the media data set with the original media key. The method and system of the present invention are applicable to all types of digital media data, and it makes no assumption of any specific media properties. The primary goal of the present invention is to significantly reduce the possibility of making any illegal copies on any nonstandard equipment and is to restrict the media data transfers only to authorized entities.

18 Claims, 2 Drawing Sheets

COPY PROTECTION METHOD AND SYSTEM FOR DIGITAL MEDIA

CROSS-REFERENCE TO RELATED APPLICATIONS

This application claims the benefit of U.S. Provisional Application Ser. No. 60/290,018, filed on May 11, 2001, in the name of inventors Hyung-Sun Kim, Alexandre Stechkine, Byung-Jin Kim, and Soung-Hyun Um, titled "Cryptography Architecture for Digital Media Protection Technology", which is hereby incorporated by reference as if fully set forth herein.

BACKGROUND OF THE INVENTION

1. Field of the Invention

The present invention relates to media copy protection, and more particularly, to digital media copy protection method and system being able to prevent any unauthorized access to a digital media data set using a hybrid cryptographic technique.

2. Discussion of the Related Art

Communication systems such as computer networks, telecommunication systems, and other systems are increasingly using cryptography for the security of information. There are two main classes of cryptographic systems: symmetric key and public key cryptographic systems. In a symmetric key cryptographic system, a symmetric (secret) key is used for both of data encryption and decryption processes. There are several efficient implementations of the symmetric key cryptographic system, but the actual key managements of such implementations are often troublesome.

On the other hand, in a public key cryptographic system, the data encryption and decryption processes are independent from each other. That is, the data encryption process requires a public key, often designated as e, while the data decryption process requires a different (but mathematically related) private key d. Therefore, an entity being possessed of the public key may encrypt a plaintext, which is the original form of a message, but the entity may not be able decrypt a ciphertext, which is the encrypted form of the message.

If an entity selects a public key and publishes the public key, anyone is able to use the key to encrypt one or more messages for the entity. Then the entity keeps his private key secret so that he or she is the only one who can decrypt the ciphertexts of the messages. The implementations of the public key cryptographic systems are currently less efficient than those of the symmetric key cryptographic systems, but they are much safer.

In a hybrid cryptographic system, a plaintext is encrypted with a symmetric key corresponding to a symmetric algorithm. The symmetric key is then encrypted with a public key having a public algorithm. When a receiver receives the public key-encrypted symmetric key and the symmetric key-encrypted data, the receiver initially decrypts the symmetric key by using his own private key. Subsequently, the receiver decrypts the encrypted data by using the decrypted symmetric key. The processes of obtaining the original data in a hybrid cryptographic system are usually faster than those of the public key cryptographic system. In addition, a hybrid cryptographic system may allow using a different symmetric key each time, considerably enhancing the security of the symmetric algorithm. For that reason, the hybrid cryptographic systems are ideal for transferring the protected media data safely to a receiver.

SUMMARY OF THE INVENTION

Accordingly, the present invention is directed to copy protection method and system for digital media data that substantially obviates one or more problems due to limitations and disadvantages of the related art.

An object of the present invention is to provide a copy protection system and method that prevents any unauthorized access to a digital media data set by using a hybrid cryptographic technique and a media certificate.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a copy protection method for digital media includes (a) encrypting an original media data set with a symmetric algorithm corresponding to an original media key; (b) generating an intermediate key by encrypting the original media key with a media identification; (c) encrypting the intermediate key with a public key of a compliant playing device; and (d) delivering the encrypted media data set, the encrypted intermediate key, and a media certificate to the playing device, the certificate including a private key identification of the playing device.

The method further includes (e) searching for an actual private key corresponding to the private key identification; (f) decrypting the delivered intermediate key with the actual private key; (g) obtaining the original media key by decrypting the decrypted intermediate key with the media identification; and (h) decrypting the delivered media data set with the obtained media key.

In another aspect of the present invention, a copy protection system for digital media includes a private key verifier receiving a media certificate that includes a private key identification of a compliant playing device and searching for an actual private key corresponding to the private key identification; an intermediate key decryptor receiving an encrypted intermediate key and decrypting the intermediate key with the actual private key; a media key decryptor obtaining an original media key by decrypting the decrypted intermediate key with a media identification; and a media data decryptor receiving an encrypted media data set and decrypting the media data set with the original media key.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
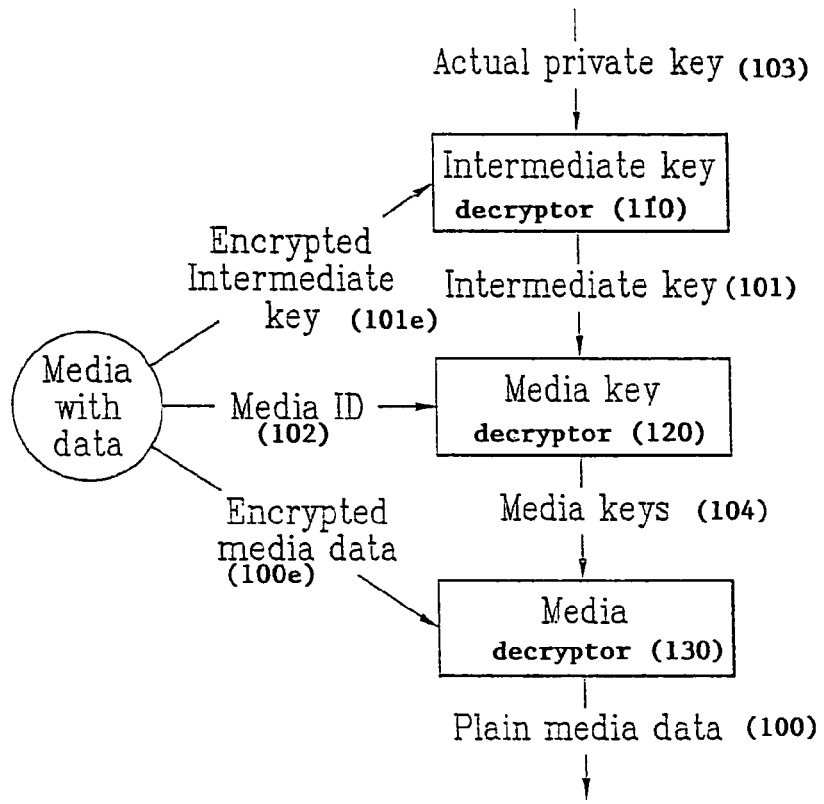
FIG. 1 illustrates media data decryption method and system according to the present invention.

The media protection method and systems according to the present invention, which are shown in FIG. 1, are based on general hybrid cryptographic principles. Initially, a media data set (100) is encrypted with a symmetric algorithm corresponding to an original media key (104). Then an intermediate key (101) is generated by encrypting the original media key (101) with a media identification (102). Then the intermediate key (101) is encrypted independently for each compliant device's public key. Next, the encrypted media data set (100e) and the encrypted intermediate key (101e) are delivered to one or more target playing devices.

Figure 2:
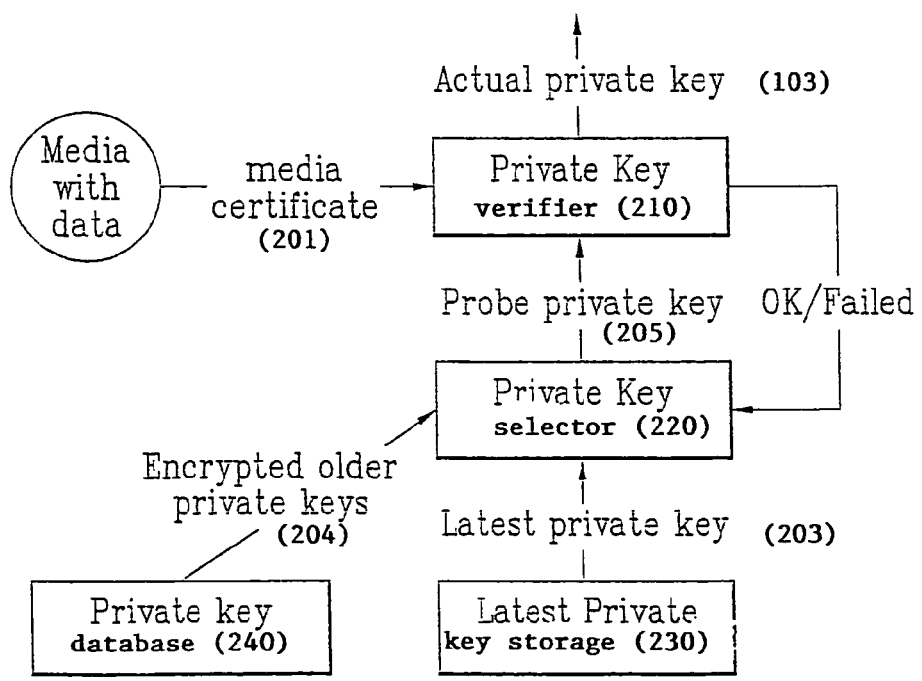
FIG. 2 illustrates a process of extracting an actual private key by using a media certificate in accordance with the present invention.

When one of the compliant playing devices plays the received media data set (100e), an intermediate key decryptor (110) in the device uses its own private key (103) to decrypt the received intermediate key (101e), which is previously encrypted with the public key of the device. Subsequently, a media key decryptor (120) in the device obtains the original media key by decrypting the decrypted intermediate key (101) with the media identification (102). Finally, a media data decryptor (130) in the device is able to decrypt the delivered media data set (100e) with the original media key (104) to get the original media data set (100). These processes are shown in FIGS. 1 and 2. The cryptographic levels of the public-key encryption of the intermediate key and the media key encryption of the media data set are chosen so that the encrypted data are safe enough to resist against any known types of attacks.

In general, different groups of devices have different private keys. The device grouping principles are out of the scope of the present invention. When a media data set (100) is delivered to devices having different private keys, the data set (100) must contain several different samples of the media key, one for each device's private key. Then each device must be able to recognize its own encrypted sample in order to obtain a valid media key (104). This can be done in a digital media format-specific manner.

In addition, each device may have several available private keys (203 and 204) due to previous key revocation processes: a current private key (203) and several revoked private keys (204). A media data set (100) currently being played by a playing device may be a new data set or an old data set that was played previously. In order to recognize a valid private key (103) among the available keys (203 and 204) in such case, a media certificate (201) included in the media data set (100) can be used.

Every media data set contains several media certificates, one for each group of devices having a same private key. A media certificate (201) includes the media identification (102) and the private key identification of a group of devices. The private key identification is generated by encrypting the media identification (102) with the public key of each device. In this way, each compliant device can easily recognize the actual private key (103) by decrypting the private key identification and comparing the decrypted private key identification with each of available private keys (203 and 204) stored in the playing device.

A playing device must have a secure and rewritable memory storage (240) for storing all the older private keys (204). All the data stored in this memory storage (240) must be encrypted with a current public key. Before the playing device plays a media data set (100), it initiates an appropriate private key search process, which is shown in FIG. 2. Referring to FIG. 2, one of the available private keys (203 and 204) is selected by a private key selector (220) in the device. The selected private key is a probe private key (205) which is an object verification. The probe private key (205) is verified by private key verifier (210) by using the media certificate (201) that includes a private key identification of the device and searching for an actual private key (103) corresponding to the private key identification. As it is shown in the figure, all the stored private keys (203 and 204) stored in private key database (240) and latest private key storage (230) including a current private key (203) are tested with a media certificate (201) until a "right" private key (103) is found. If no "right" key is found, the media data set is considered as being unplayable.

For compromising a private key of a device, a key-renewing certificate (301) can be delivered to the device together with a media data set (100). The storage of the key-renewing certificate on the media data set is out of the scope of the present invention. The key-renewing certificate (301) contains a pair of new public and private keys (303 and 304) of the device, which are encrypted with a master public key of the device. The master public key and its corresponding master private key (302) of the device are stored inside master key storage (350) of the device. For security reasons, the master private key (302) of the device must be encrypted with a current public key of the device and stored in the master key storage (350). The certificate (301) further contains time marks for sequencing the public and private keys from the oldest to the newest, respectively. The pair of new public and private keys (303 and 304) and the time marks are key renew data. The key renewing process is performed using the key renew data. The key renewing process is described below by reference to FIG. 3.

Figure 3:
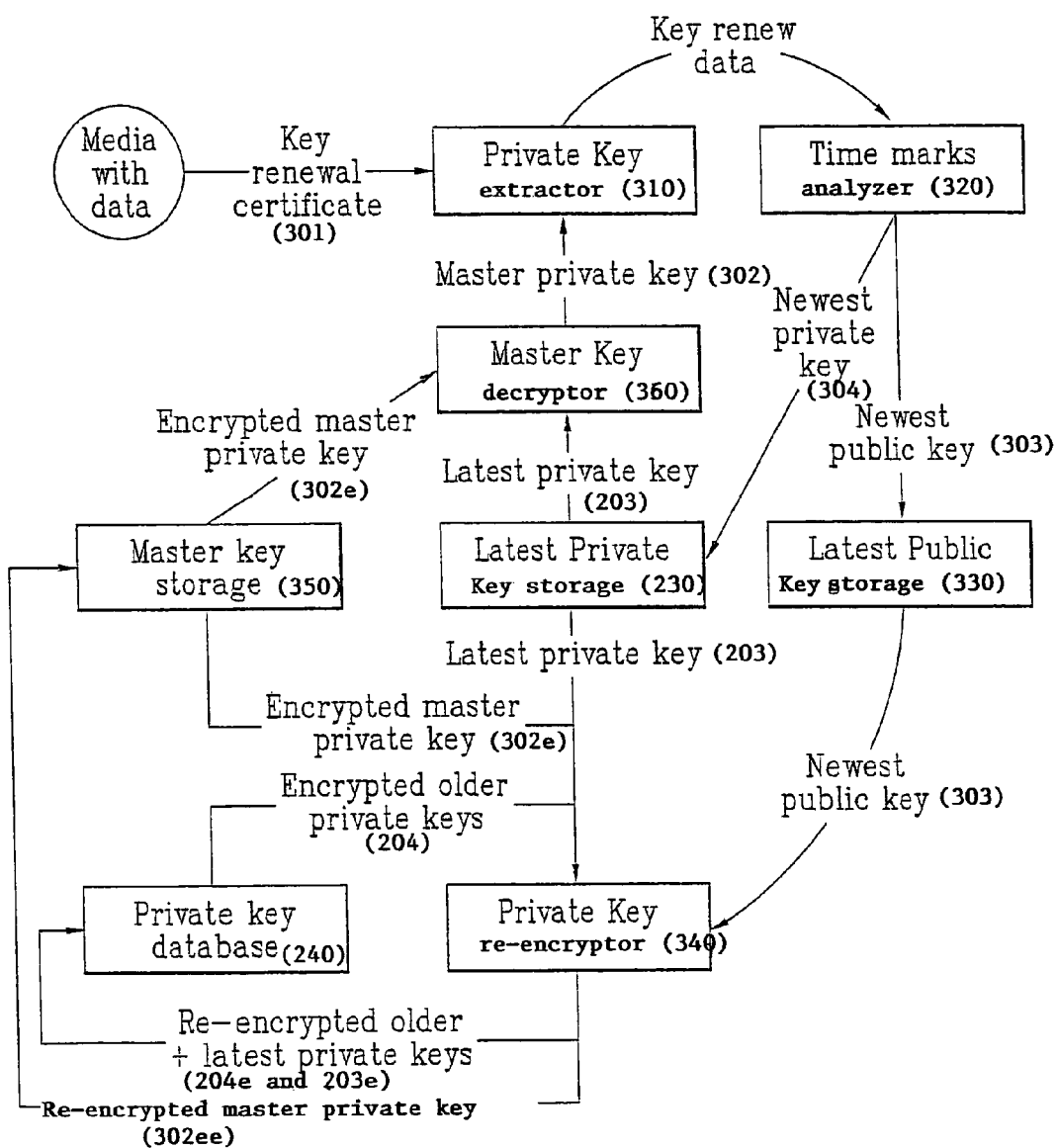
FIG. 3 illustrates an automatic key-renewing process according to the present invention.

First, a key-renewing certificate (301) is processed by using a master private key (302) of the device and the public and private keys are extracted by a private key extractor (310) in the device, and the time marks are analyzed by a time marks analyzer (320). If the issued key-renewing certificate (301) is the newest one, the extracted public and private keys (303 and 304) replace the older key pair. In other words, the latest public key within a latest public key storage (330) in the device is replaced with the newest public key (303) and the latest private key within a latest private key storage (230) is replaced with the newest private key (304). The previous private key, that is, the latest private key (203) is included in a private key database (240), and the whole database (240) including older private keys (204) and the latest private key (203) and a master private key (302) are re-encrypted with a new public key (303) by a private key re-encryptor (340). The re-encrypted older and latest private keys (204e and 203e) are stored in the private key database (240) and the re-encrypted master private key is stored in the master key storage (350). This process is illustrated in FIG. 3.

A master key compromise of a device is very improbable, but it does not mean that it never happens. If it occurs by any chance, a new media data set must be issued with key-renewing certificates associated with a new master key, and any device receiving the media data set is subjected to replace its master key with the customer service. Referring to FIG. 3, in the case that a new media data with key-renewing certificate is provided, the re-encrypted master private key (302ee) is stored in the master key storage (350) as the new master private key (302e). In a new key renewing process, the re-encrypted master private key (302ee) in the master key storage (350) is used. And the newest private key (304) stored in the latest private key storage (230) replaced with the previous one becomes a new latest private key (203). Namely, the new latest private key (304) is the current private key of the device in the new key renewing process. The new encrypted master private key (302e) is decrypted using the new private key (203) by a master key decryptor (360) and the decrypted new master private key (302) is used for renewing private and public keys (340). The key renewing process using the new master private key (302) is the same as the afore-mentioned key renewing process.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A copy protection method for digital media, the method comprising:
   (a) encrypting an original media data set with a symmetric algorithm corresponding to an original media key;
   (b) generating an intermediate key by encrypting said original media key with a media identification;
   (c) encrypting said intermediate key with a public key of a compliant playing device;
   (d) delivering said encrypted media data set, said encrypted intermediate key, and a media certificate to said playing device, said certificate including a private key identification of said playing device;
   (e) searching for an actual private key corresponding to said private key identification;
   (f) decrypting said delivered intermediate key with said actual private key;
   (g) obtaining said original media key by decrypting said decrypted intermediate key with said media identification; and
   (h) decrypting said delivered media data set with said obtained media key, wherein said media identification and said public key are separately provided and are independent of each other.

2. The method of claim 1, wherein said actual private key is searched by checking whether each of available private keys stored in said playing device corresponds to said private key identification.

3. The method of claim 2, wherein said available private keys include a current private key and one or more old private keys, each of said old private keys being previously revoked through a key revocation process.

4. The method of claim 3, wherein said playing device includes a rewritable memory for storing said old private keys.

5. The method of claim 4, wherein said old private keys being stored in said memory are encrypted with said public key.

6. The method of claim 1, wherein said original media key and said intermediate key are encrypted in (b) and (c) with independent encipherment algorithms.

7. A copy protection system for digital media, the system comprising:
   a private key verifier receiving a media certificate that includes a private key identification of a compliant playing device and searching for an actual private key corresponding to said private key identification;
   an intermediate key decryptor receiving an encrypted intermediate key and decrypting said intermediate key with said actual private key;
   a media key decryptor obtaining an original media key by decrypting said decrypted intermediate key with a media identification; and
   a media data decryptor receiving an encrypted media data set and decrypting said media data set with said original media key, wherein said original media key and said intermediate key are encrypted with independent encipherment algorithms.

8. The system of claim 7, wherein said actual private key is searched by checking whether each of available private keys stored in said playing device corresponds to said private key identification.

9. The system of claim 8, wherein said available private keys include a current private key and one or more old private keys, each of said old private keys being previously revoked through a key revocation process.

10. The system of claim 9, further comprising a data-rewritable memory storing said one or more old private keys.

11. The system of claim 10, where said old private keys being stored in said memory are encrypted with a public key of said playing device.

12. The system of claim 7, wherein said encrypted intermediate key is initially encrypted with a public key of said playing device, said public key provided independently of said media identification.

13. The system of claim 7, wherein said encrypted media data set is initially encrypted with said original media key.

14. A copy protection method for digital media, the method comprising:
   (a) receiving an encrypted media data set, an encrypted intermediate key, and a media certificate from an external source, wherein an original media data set is encrypted with an original media key to create the encrypted media data set, said encrypted intermediate key is generated by encrypting an original media key with a media identification and is encrypted by a public key of the receiving device, and said media certificate includes a private key identification of said receiving device, wherein said original media key and said intermediate key are encrypted with independent encipherment algorithms and wherein said media identification and said public key are separately provided and are independent of each other;
   (b) searching for an actual private key corresponding to said private key identification;
   (c) decrypting said delivered encrypted intermediate key with said actual private key;
   (d) obtaining said original media key by decrypting said decrypted intermediate key with said media identification; and
   (e) decrypting said delivered encrypted media data set with said obtained media key.

15. The method of claim 14, wherein said actual private key is searched by checking whether each of available private keys stored in said receiving device corresponds to said private key identification.

16. The method of claim 15, wherein said available private keys include a current private key and one or more old private keys, each of said old private keys being previously revoked through a key revocation process.

17. The method of claim 16, wherein said receiving device includes a rewritable memory for storing said old private keys.

18. The method of claim 17, wherein said old private keys being stored in said memory are encrypted with said public key.

* * * * *